United States Patent [19]

Komatsu et al.

[11] Patent Number: 4,783,975

[45] Date of Patent: Nov. 15, 1988

[54] COLORED PEARL

[75] Inventors: Michio Komatsu, Onga; Kiyohide Mimura, Chiba, both of Japan

[73] Assignee: Catalysts & Chemicals Industries Co., Ltd., Tokyo, Japan

[21] Appl. No.: 943,519

[22] Filed: Dec. 17, 1986

[51] Int. Cl.$^4$ .............................................. A44C 17/00
[52] U.S. Cl. ...................................................... 63/32
[58] Field of Search ............................................ 63/32

[56] References Cited

U.S. PATENT DOCUMENTS 1,252,849  1/1918  Schreurs .................................. 63/32
3,075,906  1/1963  Chow ...................................... 63/32

Primary Examiner—Robert A. Hafer
Assistant Examiner—Michael Brown
Attorney, Agent, or Firm—Flynn, Thiel, Boutell & Tanis

[57] ABSTRACT

A cultured colored pearl comprises a concretion of layers of pearl around the invading material which is a molded article composed predominantly of powders of waste pearls, shells, waste coral and/or shells of Crustacea.

9 Claims, No Drawings

COLORED PEARL

BACKGROUND OF THE INVENTION

The present invention relates to a colored pearl produced by the culturing method, in particular, it relates to a colored pearl produced by the culturing method wherein a molded article being comprised essentially of calcium carbonate and having a desired color is used as a pearl nucleus, namely a foreign particle which is coated with layers of nacre.

Cultured pearls are manufactured in the manner of inserting a nucleus in a mollusk with shells such as a pearl oyster, culturing said mollusk for a predetermined period of time, and thus forming a pearl layer on the surface of said nucleus. In order to yield high quality pearls in this pearl culturing method, however, it is very important to select the nuclei to be inserted in the body of the mollusk accurately. It has generally been pointed out that the nuclei used in pearl culturing should meet the necessary conditions that said nuclei are not so poisonous as to put the mollusk to death, said nuclei should not be rejected by the mollusk, said nuclei should be superior in implantation to migrating cells, said nuclei should each have a specific gravity substantially equal to that of calcium carbonate, said nuclei are free from color shade, said nuclei have smooth surfaces and the like. Under these circumstances, as the nuclei for cultured pearls, there have been widely used those obtained by polishing the shells of Anodonta Calypigos and the like in the shape of small ball. However, it is to be noted that cultured pearls obtained by using the above mentioned nuclei made of shells are ordinarily silver-white colored, because said nuclei are white-colored.

SUMMARY OF THE INVENTION

The present invention is directed to colored pearls obtained by the pearl culturing method using, as nuclei, artificially prepared colored moldings in place of the nuclei made of shells.

That is, the colored pearls according to the present invention are characterized in being obtained by the pearl culturing method comprising inserting a nucleus in a mollusk with shells, culturing said mollusk for a sufficient period of time to form a pearl layer on the surface of said nucleus, wherein a molded article having a particle diameter of 20 mm or less is used as the nucleus for the cultured pearl, said molded article being obtained by mixing 20-100 wt% of one member selected from the group consisting of pearl powder, shell powder, coral powder and shell powder of Crustacea and having a particle diameter in the range of 0.1-105 micron meter, 0-80 wt% of calcium carbonate and 0-20 wt% of an inorganic pigment, and subjecting the resulting mixture to compression molding at a temperature of 400°-1500° C.

PREFERRED EMBODIMENTS OF THE INVENTION

The present invention can use, as the pearl powder or coral powder, the so-called waste pearl and waste coral which can never be utilized for personal ornaments or indoor ornaments. The waste pearl, the waste coral and further, the shell of Crustacea, are comprised predominantly of calcium carbonate. Said calcium carbonate, which is aragonite (rhombic system) and calcite (hexagonal system) having a low crystallinity, is characterized in that it is sintered more readily than the chemically synthesized light calcium carbonate (precipitated calcium carbonate) and heavy calcium carbonate orginated from limestone, and in addition contains organic substances (chitin, conchiolin and the like) in a small amount which can be expected to act as binders on sintering. Therefore, the present invention uses the powder obtained by crushing waste pearl, shell powder, waste coral, shell of Crustacea and the like and having a particle diameter of 0.1-105 micron meter as the material for pearl nucleus. The amount of said powder used is in the range of 20-100 wt% of said pearl nucleus. In case the particle diameter of the above mentioned powder is in excess of 105 micron meter, it becomes a cause for forming color shade on the nucleus. The preferable range of particle diameter is 0.1-50 micron meter. It is not preferable that the above mentioned powder is used in an amount of 20 wt% or less, because the moldings used for nuclei deteriorate in sintering ability. As stated previously, the organic substances contained originally in the pearl powder, shell powder, coral powder, shell powder of Crustacea and the like are considered to function as binders. Therefore, it is preferable that said powder has not been subjected to sintering and chemical treatment. In case the organic substances are contained in large amounts, however, it is feared that said organic substances segregate on a stress distribution line at the time of compression molding, whereby the moldings after cooling in the atmosphere are cracked. Accordingly, when the situation as aforesaid is anticipated, it is desired that the powder should have previously been subjected to mild heat-treatment. The occurrence of cracks caused by segregation of organic substances can be prevented to some extent by compounding the material for pearl nucleus with calcium carbonate, as referred to afterwards.

The pearl nucleus according to the present invention, if necessary, may be compounded with calcium carbonate in the range of 0-80 wt%. As the calcium carbonate referred to herein, there can be used both the light calcium carbonate and heavy calcium carbonate, so far as their particle diameter is in the range of 1-100 micron meter. In case the particle diameter of said calcium carbonate is in excess of 100 micron meter, it becomes a cause for forming color shade on the nucleus. The preferable range of particle diameter is 1-50 micron meter.

The inorganic pigment is the component for coloring the pearl nucleus used in the method according to the present invention as desired, including white and colored pigments. However, it is to be noted that when the molded article used for pearl nucleus displays a desired color without using any inorganic pigment, for instance when using the colored coral powder as the material for pearl nucleus, it is not necessary to compound any inorganic pigment therewith. Accordingly, the amount of inorganic pigment used in the present invention is selected from within the range of 0-20 wt% of the pearl nucleus. As typical inorganic pigments usable in the present invention can be enumrated titanium oxide, barium sulfate, zinc oxide (The abovementioned are white), red oxide, cadmium red (The abovementioned are red), aureolin, vanadium yellow (The abovementioned are yellow), cobalt green (The abovementioned is green), cobalt blue, vanadium blue, ultramarine blue (The abovementioned are blue), cobalt violet (The abovementioned is violet), and the like.

The pearl nucleus used for obtaining the colored pearl according to the present invention can be obtained by mixing 20–100 wt% of at least one powder selected from the group consisting of pearl powder, shell powder, pearl powder and shell powder of Crustacea, 0–80 wt% of calcium carbonate, and 0–20 wt% of inorganic pigment; and subjecting the resultant mixture to compression molding to thereby form a spherical article at a temperature of 400°–1500° C. However, this method is inconvenient in that when the molded article does not have a smooth surface, a prismatic layer is liable to be formed and so a long period of time is taken for forming nacre thereon. In view of this, it is preferable on compression molding to employ a pressure more than 100 Kg/cm$^2$, preferably, a pressure in the range of 1000–1300 Kg/cm$^2$, thereby reducing the molding time to about 5–90 minutes. When the temperature at the time of molding is less than 400° C., the sintering ability of the mixed powder deteriorates and produces a porous article. This porous article is not desirable as the pearl nucleus. A temperature of more than 1500° C. is not desirable because of apparatus problems caused on molding. The temperature most desirable for compression molding is in the range of 450°–1000° C.

Compression molding like this can be practiced by means of a hot press, but most desirably is practiced by means of a hot isostatic press. The dimensions of a molded article depend upon the dimensions of the mollusk with shells. In the case of Pinctada martenis, the large molded article used as the nucleus is 8 mm$\phi$, and the normal one is 6 mm$\phi$ or less. In the cases of P. maxima, P. margaritifera and a liminetic Hyriopsis Schlegeli, molded articles, whose dimensions are in the range of 10–17 mm$\phi$, are used as nuclei. Adding for caution's sake, the fact that the pearl nuclei produced from Anodonta Calypigos are generally small because large-sized Anodonta Calypigos are hard to obtain, and so the molded articles, whose dimensions of 10–17 mm$\phi$, are not only considerably expensive but also hard to obtain. The dimensions of nuclei usable in the present invention are 20 mm$\phi$ or less, preferably 2 mm–17 mm$\phi$.

When using the molded articles prepared as aforesaid as the nuclei for cultured pearls, these articles may be handled in the exactly same manner as the pearl nuclei obtained by grinding shells of Anodonta Calypigos and the like, and the kinds of mollusk with shells not selected. Therefore, it is possible to use the molded articles of the present invention as pearl nuclei for mollusk such as Unionidae, Hyriopsis Schlegeli, and Cristaria plicata spatiosa, (The abovementioned are limnetic), Pinctada martenis, P. margaritifera, P. maxima, Pteria Penguin, and Mytilus coruscus (The abovementioned are marine), and the like.

Around the nucleus inserted in the mollusk is first formed a Prismatic layer. Then, nacre or mother-of-pearl is formed on the surface of said layer. The thickness of said nacre layer substantially depends upon the term of cultivation, and normally grows about 0.5 mm in a year. The pearly luster (iridescence) also changes depending upon the thickness of the nacre layer. Generally speaking, the luster increases as the thickness of the nacre layer increases. However, when the nacre layer is too thick, there is the possibility that the color of the nucleus itself has been concealed. In view of this, it is desirable for the pearl culturing method according to the present invention to limit the thickness of the nacre layer to about 0.05–2.0 mm.

As is evident from above, the molded articles inserted in the mollusk in the pearl culturing method according to the present invention are predominantly composed of calcium carbonate, do not contain any components harmful to the mollusk, and have smooth surfaces. Therefore, those articles become attached to the mollusk and so do not impose any burden thereon. In addition thereto, as the compression moldings according to the present invention can be colored desirably, the method of the present invention can produce variously colored cultured pearls different from normal silver-white colored pearls. The cultured pearls obtained according to the present invention are free from decolorization even when subjected to stain removal using a hydrogen peroxide solution and the like, and are also free from cracking when subjected to drilling work.

Example

One pearl nucleus (6 mm$\phi$) composed of the following components was inserted in each of 1 group (100) of three-year old pearl oysters (Pinctada martenis), and cultured in the sea of Minamiuwa in Japan from May to December.

The kinds of pearl nuclei and culturing results are shown in the following table. The pearl nuclei were prepared by the use of following inorganic pigments and in the following manner.

| Green pigment | Crystal Green GA-1 (produced by Shiseido) |
| | Main component: Co Ti O$_3$ |
| Yellow pigment | Diapigment 6000 (produced by Mitsubishi Kinzoku) |
| | Main component: CdS |
| Blue pigment | 9300 (produced by Nitto Sankyo) |
| | Main component: CoO.Al$_2$O$_3$ |

Coral powder having a particle diameter of 5 micron meter, heavy calcium carbonate having a particle diameter of 8 micron meter and the above mentioned pigments having a particle diameter of 5 micron meter or smaller were mixed together in the predetermined percentages shown in the table. This mixture was subjected to a hot isostatic press for 30 minutes under the conditions: Temperature 600° C. and Pressure 1000 Kg/cm$^2$. The thus obtained molding was subjected to surface-grinding, and made into a 7 mm$\phi$ spherical nucleus.

| | Pearl nuclei | | | | | Water | Culturing results | | | | |
|---|---|---|---|---|---|---|---|---|---|---|---|
| Group No. | 5 μm coral powder | 8 μm heavy CaCO$_3$ | 5 μm or less pigment | Additive | Amount of(*2) ion solved out | ab-sorption (cc/g) | Yield | Edge pillar pearl | Organic pearl | Death rate | External appearance |
| 1 | 40% (2)(*1) | 40% | Green 20% | — | Na 0.11 ppm | 0.05 | 58% | 2% | 1% | 39% | Greenish pearly luster |
| 2 | 80% (6) | 0 | Blue 20% | — | | 0.02 | 55% | 2% | 3% | 40% | Bluish pearly |

-continued

| | Pearl nuclei | | | | Water ab-sorption (cc/g) | Culturing results | | | | |
|---|---|---|---|---|---|---|---|---|---|---|
| Group No. | 5 μm coral powder | 8 μm heavy CaCO₃ | 5 μm or less pigment | Additive | Amount of(*2) ion solved out | | Yield | Edge pillar pearl | Organic pearl | Death rate | External appearance |
| 3 | 40% (2) | 40% | Yellow 20% | — | | 0.05 | 40% | 3% | 7% | 50% | luster Yellowish pearly luster |
| 4 | 60% (5) | 39% | Green 1% | — | | 0.05 | 55% | 2% | 8% | 35% | Light greenish pearly luster |
| 5 | 100% (6) | 0 | 0 | — | | 0.01 | 58% | 2% | 10% | 30% | |
| 6 | 99% (5) | 0 | 0 | MMA 1% | MMA 50 ppm NA 0.11 ppm | 0.01 | 20% | 5% | 15% | 60% | |
| 7 | 0 | 75% | Green 20% | Water glass 5% | Na 98 ppm | 0.15 | 25% | 3% | 17% | 55% | |
| 8 | 20% (1) | 0 | Yellow 80% | — | Cd 0.025 ppm Na <0.1 ppm | 0.10 | 30% | 5% | 5% | 60% | |
| 9 | Red glass ball on sale | | | — | <0.1 ppm | 0 | 30% | 1% | 10% | 59% | |
| 10 | Red methacrylic resin ball | | | — | <0.1 ppm | 0 | 33% | 1% | 9% | 57% | |
| 11 | Anodonta Calypigos nuclei | | | — | Na <0.1 ppm | <0.01 | 55% | 2% | 3% | 40% | somewhat yellowish pearly luster |

(*1)The bracketed numerals each denotes the amount of organic substance (%) contained in pearl powder.
(*2)The amount of ion solved out measured by dipping 1 g of pearl nucleus in a 200 cc room temperature water and after the lapse of 24 hours.

As is evident from the above table, cultured pearls can be obtained from Group 1 to Group 5 pearl oysters cultured according to the method of the present invention, in a yield being substantially equal to that of a pearl oyster group (Group No. 11) having employed Anodonta Calypigos nuclei, and further, said pearls can be colored in a desired manner by selecting inorganic pigments to be mixed in the nuclei.

We claim:

1. A process for producing a colored pearl comprising the steps of:
   (1) forming a mixture of 20-100 wt.% of at least one member selected from the group consisting of pearl powder, shell powder, coral powder and shell powder of Crustacea and having a particle diameter in the range of 0.1-105 microns, 0-80 wt.% of calcium carbonate and 0-20 wt.% of an inorganic pigment, said weight percents being based on the weight of the mixture;
   (2) subjecting the mixture to compression molding at a temperature of 400°-1500° C. to form a molded article having a particle diameter of 20 mm or smaller,
   (3) utilizing said molded article as a nucleus by inserting it in a mollusk with shells; and
   (4) culturing said mollusk to produce a colored pearl.

2. The process of claim 1, wherein said molded article used as said nucleus is a spherical particle.

3. The process of claim 1, wherein said mixture comprises 40 wt.% of 5 micro coral powder, 40 wt.% of 8 micron heavy calcium carbonate and 20 wt.% of 5 micron or smaller green inorganic pigment.

4. The process of claim 1, wherein said mixture comprises 80 wt.% of 5 micron coral powder and 20 wt.% of 5 micron or smaller blue inorganic pigment.

5. The process of claim 1, wherein said mixture comprises 40 wt.% of 5 micron coral powder, 40 wt.% of 8 micron heavy calcium carbonate and 20 wt.% of 5 micron or smaller yellow inorganic pigment.

6. The process of claim 1, wherein said mixture comprises 60 wt.% of 5 micron coral powder, 39 wt.% of 8 micron heavy calcium carbonate and 1 wt.% of 5 micron or smaller green inorganic pigment.

7. The process of claim 1, wherein said compression molding is at a pressure of from 1000-1300 kg/cm² and a temperature of from 450°-1000° C. for 5-90 minutes.

8. The process of claim 1, wherein during said culturing step, a nacre layer is formed on said nucleus in a thickness of 0.05-2.0 mm.

9. The process of claim 1, wherein said mixture is compression molding is conducted in an isostatic press for 30 minutes at a temperature of 600° C. and a pressure of 1000 kg/cm².

* * * * *

UNITED STATES PATENT AND TRADEMARK OFFICE
CERTIFICATE OF CORRECTION

PATENT NO. : 4 783 975

DATED : November 15, 1988

INVENTOR(S) : Michio KOMATSU et al

It is certified that error appears in the above-identified patent and that said Letters Patent is hereby corrected as shown below:

Column 6, line 29; change "5 micro" to ---5 micron---.
        line 49; after "mixture" delete "is".

Signed and Sealed this

Fourth Day of July, 1989

Attest:

DONALD J. QUIGG

Attesting Officer

Commissioner of Patents and Trademarks